United States Patent [19]

Endo et al.

[11] Patent Number: 4,626,555
[45] Date of Patent: Dec. 2, 1986

[54] POLYPROPYLENE FOAMED PARTICLES

[75] Inventors: Hiroshi Endo; Toshio Yagi, both of Mie, Japan

[73] Assignee: Mitsubishi Yuka Badische Co., Ltd., Yokkaichi, Japan

[21] Appl. No.: 790,194

[22] Filed: Oct. 22, 1985

[30] Foreign Application Priority Data

Nov. 9, 1984 [JP] Japan ................... 59-236168

[51] Int. Cl.$^4$ .................................. C08J 9/22
[52] U.S. Cl. ........................ 521/59; 521/56; 521/58; 521/60; 521/134; 521/143
[58] Field of Search ............ 521/56, 60, 58, 59, 521/134, 143

[56] References Cited

U.S. PATENT DOCUMENTS

| | | | |
|---|---|---|---|
| 4,379,859 | 4/1983 | Hirosawa et al. | 521/60 |
| 4,399,087 | 8/1983 | Akiyama et al. | 521/60 |
| 4,415,680 | 11/1983 | Ushirokawa et al. | 521/60 |
| 4,436,840 | 11/1983 | Akiyama et al. | 521/60 |
| 4,448,901 | 5/1984 | Senda et al. | 521/60 |
| 4,464,484 | 8/1984 | Yoshimura et al. | 521/56 |
| 4,504,534 | 3/1985 | Adachi et al. | 521/56 |
| 4,504,601 | 3/1985 | Kuwabara et al. | 521/60 |

Primary Examiner—Morton Foelak
Attorney, Agent, or Firm—Oblon, Fisher, Spivak, McClelland & Maier

[57] ABSTRACT

Substantially non-crosslinked polypropylene resin foamed particles having a bulk density of from 8 to 100 g/l and a particle diameter of from 1 to 5 mm, the polypropylene resin is composed of from 5 to 30% by weight of a room-temperature xylene soluble matter having an ethylene content of from 20 to 80% by weight and from 70 to 95% by weight of a room-temperature xylene insoluble matter having a main melting peak temperature of from 130° to 158° C. The foamed particles provide a foamed product having well-balanced properties, such as low-temperature moldability, heat resistance, recovery from compression, and the like.

4 Claims, No Drawings

POLYPROPYLENE FOAMED PARTICLES

FIELD OF THE INVENTION

This invention relates to polypropylene foamed particles useful as a molding material for cushioning materials, such as bumpers of automobiles, and various containers.

BACKGROUND OF THE INVENTION

Polystyrene foamed products have excellent performances as a heat-insulating material and a packaging and cushioning material and find wide applications in various fields. However, they have a low recovery of compression strain and withstand heat at a temperature of 70° to 80° C. at the highest. These defects may be eliminated by using polypropylene foams or crosslinked polyethylene foams. It is difficult, however, to produce starting foamed particles for forming these polyolefin foamed products since blowing agents used for polyolefin resins have a high speed of dissipation. Any foamed particles that may be obtained have a low rate of expansion with a bulk density of from 0.1 to 0.5 g/cm³ at the highest.

In an attempt to solve this problem, there has been proposed a process for producing high-expansion polypropylene foamed particles having a bulk density of from 0.05 to 0.07 g/cm³, which comprises dispersing polypropylene resin particles in a dispersing medium, e.g., water, in a closed vessel, maintaining the dispersion at a pressure above the saturated vapor pressure of the dispersion and at a temperature above the softening point of the polypropylene to thereby penetrate the dispersing medium into the polypropylene resin particles, and then jetting the dispersion from the inside of the closed vessel under high pressure into the atmosphere, as disclosed in U.S. Pat. No. 3,770,663 corresponding to Japanese Patent Publication No. 2183/74.

According to the above-described process, water used as a dispersing medium also serves as a blowing agent, and high-expansion products having a bulk density as high as 0.016 to 0.04 g/cm³ cannot be obtained.

Attempts have been made to overcome this problem by using a combination of water and a volatile organic blowing agent as a blowing agent. That is, a process for producing polyolefin resin foamed particles which comprises dispersing polyolefin resin particles in water in a closed vessel, feeding a blowing agent into the closed vessel, heating the dispersion to a temperature above the softening point of the polyolefin resin particles but below a temperature 20° C. higher than the melting point of the polyolefin resin particles while maintaining the pressure within the closed vessel at the vapor pressure of the blowing agent or a higher pressure, opening a discharge port provided in the closed vessel below the liquid level, and releasing the dispersion containing the polyolefin resin particles impregnated with the blowing agent into an atmosphere having a lower pressure than the pressure within the closed vessel has been proposed as described in Japanese patent application (OPI) Nos. 12035/82, 25336/82, 90027/82, 195131/82, 1732/83, 23834/83, 25334/83, 33435/83, 55231/83, 76229/83, 76231/83, 76232/83, 76233/83, 76234/83 and 87027/83 (the term "OPI" herein used means "unexamined published application").

This process can provide polypropylene foamed particles having a bulk density of from 0.026 to 0.06 g/cm³. Further, it is described therein that this process can also be applied to polyethylene particles and crosslinked polyethylene particles instead of propylene copolymer particles.

Into the polypropylene foamed particles thus obtained is introduced air or nitrogen under pressure to impart secondary foamability to them, and the foamed particles are filled in a steam mold, heated to mutually melt-adhere, and cooled to form a final foamed product, such as a bumper, a container, etc.

Further, the polypropylene foamed particles are compressed by a pressurized nitrogen gas, and the compressed particles are filled in a mold, heated to mutually melt-adhere, and cooled to obtain a final foamed product.

The composition of the starting polypropylene foamed particles gives great influences on mechanical strength, heat resistance and appearance of the resulting foamed product. For example, a homopolymer of propylene is preferred in terms of appearance, heat resistance and bending strength of the resulting foamed product but inferior in low-temperature moldability. A propylene-ethylene random copolymer is excellent in low-temperature moldability, but the foamed product obtained therefom has a poor appearance due to coarse foamed cells of a size as large as 100 to 300 μm.

SUMMARY OF THE INVENTION

Accordingly, an object of this invention is to provide polypropylene foamed particles which provide a foamed product having well-balanced low-temperature moldability, heat resistance and recovery from compression.

The above object can be achieved by using a specific propylene-ethylene block copolymer or resin blend as a resin material of foamed particles.

That is, the present invention relates to substantially non-crosslinked polypropylene resin foamed particles having a bulk density of from 8 to 100 g/l and a particle diameter of from 1 to 5 mm, said polypropylene resin is composed of from 5 to 30% by weight of a room-temperature (25° C.) xylene-soluble matter (CXS) having an ethylene content of from 20 to 80% by weight and from 70 to 95% by weight of a room-temperature xylene-insoluble matter (CXIS) having a main fusion peak temperature of from 130 to 158° C.

DETAILED DESCRIPTION OF THE INVENTION

The polypropylene resin which can be used in the present invention can be obtained by the copolymerization process disclosed, e.g., in Japanese Patent Publication Nos. 16668/69 and 26190/72 and Japanese patent application (OPI) Nos. 25291/72, 115296/75 and 24995/79. The polypropylene resin to be used may also be prepared by blending homopolypropylene, an ethylene-propylene random copolymer, an ethylene-propylene-butene-1-random copolymer or an ethylene-propylene block copolymer as a main component with polyethylene, an ethylene-butene-1 copolymer, etc.

The above-described block copolymers or resin blend can be identified according to the following determination methods.

CXS and CXIS

One gram of a sample is poured into 300 ml of xylene, and the mixture is refluxed at the boiling point of xylene for 15 minutes to dissolve the sample. After cooling to room temperature, the mixture is filtered, and the filtrate is evaporated to dryness. CXS is determined from the weight of the resulting solid, and CXIS is determined from the weight of the dried filter cake.

Ethylene Content of CXS

A CXS sample as above obtained is subjected to $^{13}$C-NMR analysis at a pulse interval of 30 seconds and a pulse amplitude of 45° under a perfect decoupling condition.

Main Melting Peak Temperature of CXIS

About 5 mg of the CXIS sample as prepared above is heated to 240° C. and melted using a differential scanning calorimeter (DSC) and then cooled at a cooling rate of 10° C./min to crystallize. The sample is again heated up to 240° C. at a heating rate of 10° C./min. The main melting peak temperature reached is read off from the DSC chart obtained. When there are a plurality of peaks, an averaged temperature is taken as a main melting peak temperature.

If the main melting peak temperature of CXIS according to the DSC chart exceeds 158° C., the resulting foamed product has excellent appearance and heat resistance but a poor compressive recovery. On the other hand, if it is less than 130° C., heat resistance of the resulting foamed product is reduced.

An ethylene content of CXS smaller than 20% by weight deteriorates low-temperature characteristics of the foamed product, and an ethylene content exceeding 80% by weight reduces compressive recovery. If the proportion of CXS is greater than 30% by weight, heat resistance is reduced, and that smaller than 5% by weight reduces low-temperature characteristics. Accordingly, the most preferred is a composition comprising from 5 to 30% by weight of CXS with an ethylene content of from 20 to 80% by weight and from 70 to 95% by weight of CXIS having a main melting peak temperature of from 130° C. to 158° C. A foamed product produced from this particular composition is useful as a bumper and a packaging material for electric appliances because of its excellent appearance, heat resistance, low-temperature characteristics and compressive recovery.

A foamed product obtained from foamed particles of random copolymer alone generally has a greater cell dimension and thus poorer appearance as compared with that obtained from the above-described compositon.

The polypropylene resin which can be used in the present invention may contain an inorganic filler, e.g., talc, clay, calcium carbonate, titanium oxide, zeolite, etc.

The substantially non-crosslinked polypropylene foamed particles having a bulk density of from 8 to 100 g/l and a particle diameter of from 1 to 5 mm according to this invention can be produced by a known process as described before except that the above specified particular polypropylene resin is used. For example, the polypropylene foamed particles can be produced by a process which comprises dispersing polypropylene resin particles each weighing from 0.5 to 20 mg in water in a closed vessel, feeding a volatile blowing agent into the closed vessel, heating the dispersion to a temperature above the softening point of the polypropylene resin particles but not higher than that by 20° C., and opening a discharge port provided in the closed vessel below the water surface to release the aqueous dispersion containing the polypropylene resin particles impregnated with the blowing agent into an atmosphere having a lower pressure than in the closed vessel (e.g., the atmosphere). The release of the dispersion from the closed vessel may be facilitated by pressure application by introducing air or nitrogen into the closed vessel as taught in Japanese patent application OPI No. 55231/83 and Japanese patent application No. 156056/83.

The volatile blowing agent to be used includes organic compounds having a boiling point of less than 80° C., such as aliphatic hydrocarbons, e.g., propane, butane, pentane, hexane, heptane, etc.; and halogenated hydrocarbons, e.g, trichlorofluoromethane, dichlorodifluoromethane, dichlorotetrafluoroethane, methyl chloride, ethyl chloride, methylene chloride, etc.; either alone or in combinations of two or more thereof.

The amount of the volatile blowing agent to be used varies depending upon the kind thereof and the desired rate of expansion of the polypropylene resin particles, but usually ranges from 10 to 50 parts by weight per 100 parts by weight of the polypropylene resin particles.

Dispersing agents which can be used for dispersing the polypropylene resin particles include inorganic suspending agents,e.g., aluminum oxide, titanium oxide, calcium carbonate, basic magnesium carbonate, calcium tertiary phosphate, etc.; water-soluble high polymeric protective colloids, e.g., polyvinyl alcohol, methylcarboxy cellulose, N-polyvinyl-pyrrolidone, etc.; and anionic surface active agents, e.g., sodium dodecylbenzenesulfonate, sodium alkanesulfonates, sodium alkylsulfates, sodium olefin sulfates, acylmethyltaurines, sodium dialkylsufosuccinates, etc. Of these, it is particularly preferred to use a combination of calcium tertiary phosphate having a particle size of 0.01 to 0.8 μm as an inorganic suspending agent and sodium dodecylbenzenesulfonate. Such calcium tertiary phosphate particles can be prepared by reacting from 0.60 to 0.67 mole of phosphoric acid per mole of calcium hydroxide in water.

The amount of water to be used as a dispersing medium ranges from 150 to 1,000 parts by weight, and preferably from 200 to 500 parts by weight, per 100 parts by weight of polypropylene resin particles. If the amount of water is less than 150 parts by weight, the polypropylene resin particles are apt to undergo blocking with each other under heat or pressure, and amounts exceeding 1,000 parts by weight result in reduction of productivity of polypropylene resin foamed particles and are not, therefore, economical.

In carrying out the present invention, the polypropylene resin particles are dispersed in water as a dispersing medium in a closed vessel, and a gaseous or liquid blowing agent is fed to the aqueous dispersion. The dispersion is then heated to a temperature above the softening point of the polypropylene resin particles but not higher than that by 20° C. The pressure within the closed vessel rises upon this heating whereby the blowing agent is impregnated into the polypropylene resin particles. Thereafter, the polypropylene resin particles are released together with water from the closed vessel through a discharge port, e.g., a slit or a nozzle, provided in the lower portion of the closed vessel into a zone kept at a lower pressure than in the closed vessel, generally at atmospheric pressure. As a result, polypropylene resin foamed particles having a bulk density of from 8 to 100 g/l can be produced.

Before or after the addition of the blowing agent to the closed vessel, an inorganic gas, e.g., nitrogen, helium, air, etc., is supplied to the closed vessel to apply pressure. The introduction of the inorganic gas may be effected either before or after the heating of the dispersion.

The introduction of the inorganic gas serves to facilitate impregnation of a blowing agent into polypropylene resin particles and to produce polypropylene resin foamed particles having fine cells.

Determination of the heating temperature can be carried out by differential thermal analysis of polypropylene resin particles by the use of a differential scanning calorimeter (DSC). That is, the heating temperature can be selected between the lower limit set at a temperature about 20° C. lower than a peak of a crystal fusion temperature (so-called melting point) and the upper limit set at a temperature about 20° C. higher than the peak temperature, and is preferably 3° to 15° C. lower than the peak temperature. For example, the heating temperature is selected from 144° C. and 184° C. in the case of a propylene homopolymer having a melting point of 64° C.; from 115° C. to 155° C. in the case of a propylene-ethylene-butene-1 random copolymer having a melting point of 115° to 155° C.; and from 135° C. to 175° C. in the case of a block copolymer having a melting point of 155° C.

The heating time is from 20 to 90 minutes. During the heating, the aqueous dispersion in the closed vessel is stirred to prevent blocking of the softened polypropylene resin particles.

The resulting foamed particles are dried in a chamber at 30° C. to 65° C. to remove moisture and subjected to molding to form a cushioning material, a container, etc.

Various known methods of molding can be employed. Examples of such methods are:

(1) a method which comprises filling the polypropylene resin foamed particles in a mold, compressing the foamed particles to reduce their volume by 15 to 50%, introducing steam under pressure of 1 to 5 $Kg/cm^2G$ to melt-adhere the foamed particles to each other, and then cooling the mold to obtain a final product;

(2) a method which comprises previously impregnating the foamed particles with a volatile blowing agent to impart secondary foamability to them, filling the foamed particles in a mold, and molding them with steam;

(3) a method which comprises putting the foamed particles in a closed chamber, introducing an inorganic gas, e.g., air or nitrogen, under pressure into the chamber to increase the pressure in the cells of the foamed particles and thus impart secondary foamability, filling the foamed particles in a mold, and molding them with steam; and (4) a combination of two or more of the method (1), (2) and (3).

The polypropylene resin foamed products as obtained above show excellent melt-adhesion among the particles and high mechanical strength.

The present invention will now be illustrated in greater detail with reference to the following examples, but it should be understood that the present invention is not limited thereto. In these examples, all the parts and percents are by weight unless otherwise indicated.

PREPARATION EXAMPLE

Preparation of Ethylene-Propylene Block Copolymer

The atmosphere in a 10-liter stainless steel-made autoclave equipped with a stirrer was thoroughly replaced with propylene. The autoclave was then charged with 3.5 liters of heptane, 1.5-g of diethylaluminum monochloride, 0.5 g of titanium trichloride and 500 ml of hydrogen. The mixture was heated to 65° C., and propylene was fed thereto at a rate of 500 g/hr. After 30 minutes from the beginning of propylene feeding, ethylene was fed thereto at a rate of 10 g/hr.

When 1,800 g of propylene had been fed (after about 3.6 hours from the beginning of the feeding), the feeding of propylene and ethylene was stopped. At this time, the inner pressure of the autoclave was 5.5 $Kg/cm^2G$. The polymerization was continued until the inner pressure of the autoclave decreased to 2.0 $Kg/cm^2G$. The autoclave was purged to an inner pressure of 0.4 $Kg/cm^2G$, and ethylene and propylene were fed to the autoclave at an inner temperature of 65° C. at a rate of 70 g/hr and 50 g/hr, respectively, followed by purging the autoclave.

The resulting block copolymer had a density of 0.90 $g/cm^3$, a melt flow rate (MFR) of 4.3 g/l min (measured at 230° C.) and an ethylene content of 4.5% by weight. The copolymer was found to have a melting peak temperature of 154° C. and a crystallization peak temperature of 106° C. by differential thermal analysis using a differential scanning calorimeter (DSC).

EXAMPLE 1

The block copolymer as obtained in Preparation Example was melt-kneaded in an extruder at 230° C. and extruded in strand. After cooling with water, the strand was chopped into pellets to obtain resin particles each weighing 1 mg.

In an autoclave were charged 250 parts of water, 100 parts of the resin particles as above obtained, 1.0 part of calcium tertiary phosphate having a particle diameter of 0.3 to 0.5 μm and 0.007 part of sodium dodecylbenzenesulfonate (packing: 62%). Nitrogen gas was introduced to the resulting aqueous dispersion in the autoclave while stirring until the inner pressure of the autoclave increased to 5 $Kg/cm^2G$, whereupon the feeding of nitrogen was stopped. Then, 18 parts of isobutane was fed to the autoclave, and the dispersion was heated to 143° C. over a period of 1 hour. When the dispersion was maintained at that temperature for 45 minutes, the inner pressure of the autoclave reached 27 $Kg/cm^2G$.

A valve of a discharge nozzle provided at the bottom of the autoclave was opened, and the dispersion was jetted therethrough into the atmosphere for about 2 seconds to effect foaming. The inner pressure of the autoclave was about 12.7 $Kg/cm^2G$ the moment a final portion of the dispersion was released. During the release, the temperature of the autoclave was kept at 143° C.

The resulting polypropylene foamed particles had a bulk density of about 31 g/l, a particle diameter of 3.3 mm and a foamed cell diameter of 60 μm. Blocking among the foamed particles was not observed.

After the foamed particles were allowed to stand in a chamber at 40° C. for 2 days to remove moisture, they was excessively packed in a cavity of a mold having steam holes. The foamed particles were compressed to decrease their volume by about 50%. Steam under a pressure of 4.0 $Kg/cm^2G$ was introduced to the mold to meltadhere the foamed particles to each other, followed by cooling with water for 10 seconds and then being allowed to cool for 30 seconds. The mold was opened to take out a final foamed product having a bulk density of about 60 g/l, a length of 300 mm, a width of 300 mm and a thickness of 50 mm.

The resulting polypropylene foamed product was evaluated for appearance, compressive strength, elastic recovery from compressive strain, heat resistance and freeze resistance according to the following test methods, and the results obtained are shown in Table 2.

1. Appearance:

Appearance was evaluated according to the following scale:

| | |
|---|---|
| A surface of a molded product is smooth and has good gloss | ⊚ |
| A surface of a molded product is smooth and has gloss | ○ |
| A surface of a molded product is smooth but slightly inferior in gloss | △ |
| A surface of a molded product is uneven | X |

2. Compressive Strength:

A sample having a size of 50 mm (L)×50 mm (W)×50 mm (T) was used. The compressive strength was determined from the stress at 50% compression in accordance with JIS K6767.

3. Elastic Recovery from Compression:

A sample of the same size as used above was compressed from all sides at a rate of 10 mm/min using an Instron tester until a stress of 4.0 Kg/cm² was applied. The sample was maintained under that stress for 20 seconds, and then released. An elastic recovery against compression was obtained from the following equation:

$$\text{Elastic Recovery Against Compression} = \frac{\text{Thickness After Compression}}{\text{Thickness Before Compression (50 mm)}} \times 100$$

4. Heat Resistance:

A sample of a size of 80 mm (L)×80 mm (W)×50 mm (T) was heated at 100° C. for 24 hours, followed by allowing to cool at 20° C. for 24 hours. The dimension after the cooling was measured, and a factor of dimensional shrinkage was calculated as follows:

$$\text{Factor of Dimensional Shrinkage} = \frac{\text{Dimension Before Heating} - \text{Dimension After Heating}}{\text{Dimension Before Heating}} \times 100$$

5. Freeze Resistance:

A sample of the same size as used in 4 above was subjected to a falling ball test at −40° C. using a steel ball of 5.5 Kg to obtain a falling weight impact strength (drop height: cm).

EXAMPLES 2 to 5 and COMPARATIVE EXAMPLES 1 to 7

Resin foamed particles were produced in the same manner as described in Example 1 but using each of the resin shown in Table 1 below as a starting resin and changing the heating temperature after the feed of isobutane as shown in Table 2.

The resulting foamed particles were molded in the same manner as in Example 1 but changing the steam pressure and cooling cycle as shown in Table 2 to obtain a foamed product. The cooling time was selected with the guidance of a crystallization peak temperature ($T_{cp}$) of the resin particles so as to provide a molded product free from deformation.

The physical properties of the resulting foamed particles and foamed product are also shown in Table 2.

TABLE 1

| Abbreviation | Composition of Resin | $T_{cp}$ (°C.) | Ethylene Content of CXS (wt %) | Proportion of CSX (wt %) | Main Melting Peak of CXIS (°C.) |
|---|---|---|---|---|---|
| EPP#1 | Block copolymer of Example 1 | 106 | 65 | 7 | 154 |
| PP | Homopolypropylene | 109 | — | — | 161 |
| EPF | Ethylene(4.4%)-propylene random copolymer | 98 | — | — | 138 |
| EPP#2 | Ethylene-propylene block copolymer | 111 | 30 | 21 | 161 |
| EPF/EPR | EPF(85%)/EPR*(15%) blend | 100 | 72 | 20 | 142 |
| EPP#3 | Ethylene-propylene block copolymer | 102 | 23 | 6 | 145 |
| EPP#4 | Ethylene-propylene block copolymer | 111 | 50 | 21 | 158 |
| EPF/EPR | EPF(65%)/EPR(35%) blend | 99 | 72 | 38 | 142 |
| PP/EPF/EPR | PP(77%)/EPF(20%)/EPR(3%) blend | 110 | 71 | 4 | 158 |
| EPBF/EPR | EPBF**(90%)/EPR(10%) blend | 90 | 72 | 15 | 134 |
| PP/EPP | PP(30%)/EPP(70%) blend | 108 | 18 | 20 | 157 |
| EPF/EPP/HD.PE | EPF(80%)/EPP(10%)/HD.PE***(10%) blend | 106 | 85 | 10 | 154 |

Note:
*EPR: Ethylene-propylene rubber having an ethylene content of 72 wt %.
**EPBF: Ethylene-propylene-butene-1 random copolymer.
***HD.PE: High density polyethylene (specific gravity: 0.960).

TABLE 2

| | Ex. 1 | Comp. Ex. 1 | Comp. Ex. 2 | Comp. Ex. 3 | Ex. 2 | Ex. 3 | Ex. 4 | Comp. Ex. 4 | Ex. 5 | Comp. Ex. 5 | Comp. Ex. 6 | Comp. Ex. 7 |
|---|---|---|---|---|---|---|---|---|---|---|---|---|
| Kind of Resin: Foamed Particles: | EPP#1 | PP | EPF | EPP#2 | EPP#3 | EPP#4 | EPF/EPR | PP/EPF/EPR | EPBF/EPR | EPF/EPR | EPF/EPP/HD.PE | PP/EPR |
| Particle | 3.3 | 3.4 | 3.3 | 3.3 | 3.4 | 3.4 | 3.4 | 3.4 | 3.4 | 3.3 | 3.4 | 3.3 |

TABLE 2-continued

| | Ex. 1 | Comp. Ex. 1 | Comp. Ex. 2 | Comp. Ex. 3 | Ex. 2 | Ex. 3 | Ex. 4 | Comp. Ex. 4 | Ex. 5 | Comp. Ex. 5 | Comp. Ex. 6 | Comp. Ex. 7 |
|---|---|---|---|---|---|---|---|---|---|---|---|---|
| Diameter (mm) Cell Diameter (μm) | 60 | 22 | 225 | 50 | 80 | 30 | 60 | 41 | 83 | 35 | 38 | 75 |
| Bulk Density (g/l) | 31 | 30 | 31 | 30 | 29 | 29 | 30 | 28 | 30 | 31 | 30 | 30 |
| Heating Temperature (°C.) | 143 | 148 | 130 | 150 | 140 | 155 | 140 | 150 | 125 | 150 | 150 | 150 |
| Foamed Product: | | | | | | | | | | | | |
| Appearance | | | Δ | | | | | | | | | |
| Density (g/l) | 60 | 60 | 60 | 60 | 59 | 61 | 60 | 58 | 60 | 60 | 60 | 60 |
| Compressive Strength (Kg/cm$^2$) | 6.1 | 9.0 | 5.9 | 6.1 | 6.5 | 6.0 | 6.0 | 6.5 | 6.0 | 5.8 | 6.0 | 6.3 |
| Elastic Recovery from Compression (%) | 96 | 93 | 95 | 87 | 95 | 95 | 93 | 95 | 94 | 93 | 80 | 93 |
| Heat Resistance at 100° C. (%) | 0.3 | 0.3 | 1.0 | 0.3 | 0.3 | 0.3 | 0.3 | 0.3 | 0.6 | 1.0 | 0.3 | 0.3 |
| Freeze Resistance (falling ball at −40° C., cm) | 300< | 100 | 150 | 300< | 300< | 300< | 300< | 150 | 300< | 300< | 300< | 150 |
| Steam Pressure During Molding (Kg/cm$^2$G) | 4.0 | 5.5 | 2.0 | 5.0 | 4.0 | 5.0 | 3.0 | 5.5 | 1.3 | 5.0 | 4.0 | 5.0 |
| Cooling Cyclic After Molding (sec) | 80 | 90 | 65 | 90 | 80 | 90 | 80 | 90 | 70 | 80 | 70 | 90 |

While the invention has been described in detail and with reference to specific embodiments thereof, it will be apparent to one skilled in the art that various changes and modifications can be made therein without departing from the spirit and scope thereof.

What is claimed is:

1. Substantially non-crosslinked polypropylene foamed particles having a bulk density of from 8 to 100 g/l and a particle diameter of from 1 to 5 mm, said polypropylene resin comprising from 5 to 30% by weight of a room-temperature xylene soluble matter having an ethylene content of from 20 to 80% by weight and from 70 to 95% by weight of a room-temperature xylene insoluble matter having a main melting peak temperature of from 130° to 158° C., wherein said polypropylene resin is an ethylene-propylene block copolymer, a mixture of an ethylene-propylene random copolymer and an ethylene-propylene rubber, or a mixture of an ethylene-propylene-butene-1 random copolymer and an ethylene-propylene rubber.

2. Polypropylene foamed particles as in claim 1, wherein said polypropylene resin is an ethylene-propylene block copolymer.

3. Polypropylene foamed particles as in claim 1, wherein said polypropylene resin is a mixture of an ethylene-propylene random copolymer and an ethylene-propylene rubber.

4. Polypropylene foamed particles as in claim 1, wherein said polypropylene resin is a mixture of an ethylene-propylene-butene-1 random copolymer and an ethylene-propylene rubber.

* * * * *